US012011877B2

(12) United States Patent
Susnjara et al.

(10) Patent No.: US 12,011,877 B2
(45) Date of Patent: *Jun. 18, 2024

(54) APPARATUS AND METHOD FOR PRINTING LARGE THERMOPLASTIC PARTS DURING ADDITIVE MANUFACTURING

(71) Applicant: Thermwood Corporation, Dale, IN (US)

(72) Inventors: Kenneth J. Susnjara, Birdseye, IN (US); Scott G. Vaal, Jasper, IN (US); Brian S. Smiddy, Newburgh, IN (US); Jonathan I. Fuquay, Boonville, IN (US)

(73) Assignee: Thermwood Corporation, Dale, IN (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/452,436

(22) Filed: Oct. 27, 2021

(65) Prior Publication Data

US 2022/0040922 A1    Feb. 10, 2022

Related U.S. Application Data

(63) Continuation of application No. 17/160,074, filed on Jan. 27, 2021, now Pat. No. 11,179,893, which is a
(Continued)

(51) Int. Cl.
*B29C 64/118*     (2017.01)
*B29C 48/00*      (2019.01)
(Continued)

(52) U.S. Cl.
CPC ........ *B29C 64/295* (2017.08); *B29C 48/2886* (2019.02); *B29C 64/106* (2017.08);
(Continued)

(58) Field of Classification Search
CPC . B29C 64/295; B29C 48/2886; B29C 64/106; B29C 64/118; B29C 64/205;
(Continued)

(56) References Cited

U.S. PATENT DOCUMENTS 5,740,051 A    4/1998   Sanders, Jr. et al.
6,054,077 A    4/2000   Comb et al.
(Continued)

FOREIGN PATENT DOCUMENTS

CN      104149352 B    9/2017
DE    102016200522 A1   7/2017
(Continued)

OTHER PUBLICATIONS

International Search Report and Written Opinion for International Application No. PCT/US2018/041208, dated Oct. 29, 2018 (13 pages).
(Continued)

*Primary Examiner* — Jeffrey M Wollschlager
(74) *Attorney, Agent, or Firm* — Bookoff McAndrews, PLLC

(57) ABSTRACT

Embodiments of the present disclosure are drawn to additive manufacturing apparatus and methods. An exemplary additive manufacturing system may include an extruder, the extruder having an opening dimensioned to receive a material. The apparatus may also include an extruder output in fluid communication with the extruder, wherein the extruder output extends away from the extruder along a longitudinal axis. One or more heaters positioned along at least a portion of the extruder output may also be included, and, as the material passes through the extruder output, the one or more heaters may at least partially melt the material. The system may also include a gear pump in fluid communication with the extruder output for receiving the at least partially melted
(Continued)

material, and a nozzle in fluid communication with the gear pump for depositing the at least partially melted material.

20 Claims, 5 Drawing Sheets

Related U.S. Application Data continuation of application No. 15/703,558, filed on Sep. 13, 2017, now Pat. No. 10,933,586.

(51) Int. Cl.

| | |
|---|---|
| B29C 48/285 | (2019.01) |
| B29C 64/106 | (2017.01) |
| B29C 64/205 | (2017.01) |
| B29C 64/209 | (2017.01) |
| B29C 64/218 | (2017.01) |
| B29C 64/227 | (2017.01) |
| B29C 64/232 | (2017.01) |
| B29C 64/236 | (2017.01) |
| B29C 64/241 | (2017.01) |
| B29C 64/25 | (2017.01) |
| B29C 64/295 | (2017.01) |
| B29C 64/386 | (2017.01) |
| B29C 64/40 | (2017.01) |
| B33Y 10/00 | (2015.01) |
| B33Y 30/00 | (2015.01) |
| B33Y 40/00 | (2020.01) |
| B33Y 70/00 | (2020.01) |

(52) U.S. Cl.
CPC .......... *B29C 64/118* (2017.08); *B29C 64/205* (2017.08); *B29C 64/209* (2017.08); *B29C 64/227* (2017.08); *B29C 64/232* (2017.08); *B29C 64/236* (2017.08); *B29C 64/241* (2017.08); *B29C 64/386* (2017.08); *B33Y 30/00* (2014.12); *B33Y 40/00* (2014.12); *B33Y 70/00* (2014.12); *B29C 48/023* (2019.02); *B29C 64/218* (2017.08); *B29C 64/25* (2017.08); *B29C 64/40* (2017.08); *B33Y 10/00* (2014.12)

(58) Field of Classification Search
CPC ... B29C 64/209; B29C 64/227; B29C 64/232; B29C 64/236; B29C 64/241; B29C 64/386; B29C 48/023; B29C 64/218; B29C 64/25; B29C 64/40; B33Y 30/00; B33Y 40/00; B33Y 70/00; B33Y 10/00
See application file for complete search history.

(56) References Cited

U.S. PATENT DOCUMENTS

| | | | |
|---|---|---|---|
| 6,119,567 A | 9/2000 | Schindler et al. | |
| 6,722,872 B1 | 4/2004 | Swanson et al. | |
| 7,168,935 B1 | 1/2007 | Taminger et al. | |
| 7,731,816 B2 | 6/2010 | Oldani et al. | |
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 9,566,744 B1 | 2/2017 | Carbone et al. | |
| 2003/0056870 A1 | 3/2003 | Comb et al. | |
| 2003/0064124 A1 | 4/2003 | Comb | |
| 2007/0044899 A1 | 3/2007 | Tingley | |
| 2008/0006017 A1 | 1/2008 | Rindels | |
| 2010/0200168 A1 | 8/2010 | Oldani et al. | |
| 2013/0089642 A1 | 4/2013 | Lipson et al. | |
| 2014/0035182 A1* | 2/2014 | Boyer | B29C 64/10 425/135 |
| 2014/0117575 A1* | 5/2014 | Kemperle | B29C 64/106 264/40.7 |
| 2014/0265040 A1 | 9/2014 | Batchelder | |
| 2014/0271964 A1 | 9/2014 | Roberts, IV et al. | |
| 2014/0371895 A1 | 12/2014 | Sadusk et al. | |
| 2015/0328839 A1 | 11/2015 | Willis et al. | |
| 2016/0031155 A1 | 2/2016 | Tyler | |
| 2016/0075089 A1 | 3/2016 | Duro Royo et al. | |
| 2016/0090842 A1* | 3/2016 | Luo | B23K 28/02 219/121.64 |
| 2016/0207260 A1 | 7/2016 | Lee et al. | |
| 2016/0207263 A1* | 7/2016 | Gordon | G05D 23/1917 |
| 2016/0236408 A1 | 8/2016 | Wolf et al. | |
| 2016/0236409 A1* | 8/2016 | Armani | B29C 64/106 |
| 2016/0266573 A1* | 9/2016 | Bheda | B29C 64/106 |
| 2016/0279876 A1* | 9/2016 | Truchsess | B33Y 30/00 |
| 2016/0369399 A1* | 12/2016 | Ma | B29C 64/153 |
| 2017/0008230 A1 | 1/2017 | Yuyama | |
| 2017/0036399 A1 | 2/2017 | Cheung | |
| 2017/0102689 A1* | 4/2017 | Khajepour | B22F 12/20 |
| 2017/0120513 A1* | 5/2017 | Brennan | B29B 7/404 |
| 2017/0165920 A1 | 6/2017 | Leavitt et al. | |
| 2017/0182698 A1 | 6/2017 | Susnjara | |
| 2017/0203506 A1 | 7/2017 | Hjelsand et al. | |
| 2017/0217089 A1 | 8/2017 | Batchelder et al. | |
| 2017/0297095 A1 | 10/2017 | Zalameda et al. | |
| 2017/0320272 A1* | 11/2017 | Mantell | B29C 48/02 |
| 2017/0348900 A1 | 12/2017 | Williams et al. | |
| 2018/0001560 A1 | 1/2018 | Yoshida | |
| 2018/0015655 A1* | 1/2018 | Gheorghescu | B29C 64/393 |
| 2018/0050502 A1 | 2/2018 | Oldani et al. | |
| 2018/0111313 A1 | 4/2018 | Murao et al. | |
| 2018/0186079 A1* | 7/2018 | Vilajosana | B29C 64/165 |
| 2018/0200955 A1* | 7/2018 | Hoelldorfer | B33Y 30/00 |
| 2018/0229448 A1* | 8/2018 | Bastian | B33Y 10/00 |
| 2018/0345600 A1 | 12/2018 | Holdford et al. | |
| 2019/0010327 A1* | 1/2019 | Gallucci | D01F 6/94 |
| 2019/0070778 A1 | 3/2019 | Haid et al. | |
| 2019/0217546 A1* | 7/2019 | Bosveld | B29C 64/227 |
| 2019/0232566 A1 | 8/2019 | Bosveld | |
| 2019/0381737 A1 | 12/2019 | Sansare | |

FOREIGN PATENT DOCUMENTS

| | | |
|---|---|---|
| WO | WO 2015/065936 A2 | 5/2015 |
| WO | WO 2015/129733 A1 | 9/2015 |
| WO | WO 2017/08984 A1 | 3/2017 |

OTHER PUBLICATIONS

Examiner's Report dated Apr. 7, 2021, in corresponding Canadian Application No. 3,074,997.

* cited by examiner

APPARATUS AND METHOD FOR PRINTING LARGE THERMOPLASTIC PARTS DURING ADDITIVE MANUFACTURING

CROSS-REFERENCE TO RELATED APPLICATION(S)

This patent application is a continuation of and claims the benefit of priority to U.S. patent application Ser. No. 17/160,074, filed on Jan. 27, 2021, which is a continuation of U.S. patent application Ser. No. 15/703,558, filed on Sep. 13, 2017, which is now U.S. Pat. No. 10,933,586, issued on Mar. 2, 2021, the entireties of which are incorporated herein by reference.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing manufacturing techniques or processes.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process, commonly referred to as Fused Deposition Modeling (FDM), or Fused Layer Modeling (FLM), comprises melting a thin layer of thermoplastic material, and applying this material in layers to produce a final part. This is commonly accomplished by passing a continuous, thin filament of thermoplastic material through a heated nozzle, or by passing thermoplastic material into an extruder, with an attached nozzle, which melts the thermoplastic material and applies it to the structure being printed, building up the structure. The heated material is applied to the existing structure in layers, melting and fusing with the existing material to produce a solid finished part.

Three-dimensional printing of thermoplastic parts originated with relatively small machines. These machines generally operated by feeding a thermoplastic filament through a heated nozzle, which then melted and deposited the filament material in thin layers to build up a final shape of the part. These machines also generally used a table, which when heated sufficiently, was used to bond to the material being printed and secure the material in place on the table during the printing process. It was necessary to keep the part being printed at a sufficiently high temperature so that new material being printed would bond properly to the existing structure (e.g., previously deposited layers of printed material).

While this approach may produce small parts to the final net shape, the process may be relatively slow because it requires a thin filament and thin print layers to generate a relatively smooth outer surface; thus, manufacturing larger parts may be difficult with the aforementioned process.

To address this shortcoming, a system was developed to deposit material at a higher speed, and in thicker layers (compared to net shape 3D printing), which yields a final part slightly larger in size than the final net shape (i.e., desired part). In a post-deposition process step, the printed part may be milled, or machined, to the final desired size. This process has become known as "near net shape." This approach is widely used for manufacturing large parts using 3D printing. The advantage is that it is substantially faster than the thin layer approach.

In some examples, this system may use a small plastic extruder instead of a pre-extruded filament to generate the melted print bead. In this system, the print head may move along a plane, depositing material onto a heated table, which would move downward after each layer was completed. As with the filament system, the print environment may require heat to maintain a minimum part temperature so that the newly printed material may adhere properly. Once the printing process is complete, the part may be allowed to cool. Once cooled, the part may be removed and positioned onto a second machine, which may mill or machine the cooled part to the final size and shape.

Although this process may work faster than the filament system, some disadvantages have been encountered in the practice of the aforementioned process. Namely, the cost and/or complexity of the heated table and the heated print environment were undesirable. In the heated print environment, for example, keeping the part heated until printing was complete and subsequently cooling the printed part may have resulted in internal stresses being introduced with the printed part, which were unfavorable. Moreover, another disadvantage was that a separate print and trim machine was required, which required additional floor space. Moreover, when printed parts become relatively large, they may also become heavy, which may make the process of moving them from one machine to another to trim them difficult. Lastly, since the cooled part may shrink and warp from the original print size, the cooled part's outer surface may become somewhat indistinct, making it difficult and time consuming to orient the part properly when moved to the trim machine.

SUMMARY

Aspects of the present disclosure relate to, among other things, methods and apparatus for fabricating components via additive manufacturing, e.g., 3D printing techniques. Each of the aspects disclosed herein may include one or more of the features described in connection with any of the other disclosed aspects. Exemplary embodiments may be drawn to a machine that deposits material (e.g., prints) at ambient temperature, rather than in a heated environment, using a larger print bead at a relatively higher speed compared to traditional printing techniques. Unlike prior additive manufacturing systems, which incorporate devices configured to raise the temperature of the surrounding air, embodiments of the disclosure may omit such devices configured to increase the temperature of the surrounding air. Prior systems generally print at a slower speed so that the printed material cools below a temperature at which proper bonding with an earlier-printed layer of material may occur. To counteract the cooling of a layer being printed, devices may be used to increase the temperature of the surrounding air in earlier printing systems. By contrast, embodiments of the disclosure may deposit material at a high enough speed so that it is not necessary to slow the natural cooling process by heating surrounding air. Indeed, in some embodiments of the disclosure, cooling devices, e.g., fans, may be used to cool the temperature of ambient air. Ambient air in embodiments of the disclosure may therefore range between, for example, 65-85° F., which may be cooler than ambient air in prior systems. In embodiments of the disclosure, only the print head may generate heat to melt flowable material. Accordingly, by allowing the part to be printed at ambient temperature, a previously deposited layer of print bead may naturally cool to the proper temperature as the next layer of material is being deposited, so that the process may be continuous.

Moreover, aspects of the disclosure may include a machine that requires less floor space than two separate machines, may not require movement of the printed part for machining, may machine location marks for alignment into the printed part if the printed part is to be moved, and/or may print and trim at the same time on the same machine.

Aspects of the present disclosure relate to apparatus and methods to fabricate parts that may be printed at ambient temperature(s), rather than in a heated environment or on a heated worktable, using a much larger print bead at a high enough speed that, through natural cooling, each previously printed layer may cool to a proper temperature as a next layer is printed or deposited. The printed layer may be cool enough so that it has hardened sufficiently to support the next layer without distorting, but may also be warm enough to fuse adequately with the next deposited layer of printed material. Thus, there may be an optimal temperature range for printing fully fused, quality parts. For example, some polymers, e.g., an Acrylonitrile-Butadiene-Styrene (ABS) polymer, may bond with a previously printed layer of material when it is printed at a temperature range of between approximately 100-135° C. It is acknowledged, however, that different polymers may appropriately bond with previously printed layers when those polymers printed at different temperature ranges.

The present disclosure describes a machine that may be large and robust enough to accept and move a large extruder (e.g., a large plastic extruder), including supporting equipment, at a high enough speed in order to print (or deposit) the largest layer of a flowable material (e.g., a thermoplastic material) desired in the time available, as dictated by natural cooling. Also, the extruder may be large enough to have a high enough throughput to print the largest layer of flowable material desired within the time available, as dictated by natural cooling. In some aspects, the extruder and print head may be configured to move in three dimensions, as opposed to moving the associated worktable, in order to achieve layer-to-layer vertical motion. In order to facilitate making the printing process continuous, the machine may contain a manual control actuator, e.g., a knob, button, switch, or lever, on the print control to allow an operator to speed up or slow down the speed of the print process. To further assist the operator, a thermographic camera system may be located on or adjacent to the machine, which may display the temperature of the layer being printed, the temperature of the material being output from nozzle 51, and/or the temperature of the material in the extruder output.

Since the time required for a particular thermoplastic material to cool from print temperature to the proper temperature to accept the next layer may be relatively consistent (assuming, e.g., that ambient temperature is relatively consistent), an alternative approach may be possible. In this approach, the operator may input the desired cooling time into the print control, and the print control may adjust the print feed speed so that it may require that amount of time to print each layer in order to keep the print process continuous.

The machine may also include a print gantry, which may further include an extruder larger in size than an extruder that may be used in standard 3D printing or additive manufacturing machines. This larger extruder may be operated using a servomotor and gearbox arrangement, as well as a melt pump (also referred to as a gear pump or a polymer pump), which may be attached to the extruder. In some embodiments, the melt pump may include a set of meshed gears located within a housing. The melt pump may also operate with a servomotor and gearbox. The large extruder may include an applicator head, which may be attached below the melt pump, and may further include an attached compression roller, which may be operated by a servomotor. Several servomotors may also be included with this machine, along with associated gearboxes, in order to permit the extruder to move in three dimensions (e.g., along the x-, y-, and z-axes). The machine may also include a trimming gantry, which may consist of a large router motor and several servomotors with associated gearboxes to permit the trimming gantry to move in three dimensions, as well as to rotate about two different axes. Both printing and trimming gantries may be fixed to a worktable in order to allow the machine to print a part and trim that part on the same worktable. By incorporating the printing and trimming gantries on the same worktable, less floor space may be used as opposed to having two separate machines (e.g., separate printing and trimming machines) on a manufacturing floor.

By using a common worktable that may not move, a printed part may not need to be moved to a separate trimming machine for trimming of the printed part to occur. The trimming gantry may be attached to a large-scale additive manufacturing machine, which may allow the part to be trimmed in the same location as it was printed. If an operator does want to move a printed and/or trimmed part off of the machine, location marks may be machined into the part prior to moving it. These location marks may be used later when needing to realign the part to a machine's coordinate system. For example, the part may be printed and then trimmed at a later time on the same machine or on a different machine, if desired, yet with the inclusion of the location marks, the part may be easily and quickly aligned.

The machine may also print a part on one side of a worktable, while at the same time the machine may trim a printed part on the other side of the table by using a reservation system. The reservation system may reserve space for each printing and trimming gantry to ensure that each gantry does not interfere with the other. In addition, a high-wall design may be incorporated into the machine to enclose the printing and trimming operations. The high-wall design may enclose dust and fumes generated during the printing and/or trimming process. The machine may also include a dust and fume extraction system to remove any unwanted printing fumes and/or trimming dust during and/or after printing and trimming. The dust and fume extraction system may be part of the high-wall design.

Embodiments of the present disclosure may be drawn to additive manufacturing systems. An additive manufacturing system may include an extruder having an opening dimensioned to receive a material. The additive manufacturing system may also include an extruder output in fluid communication with the extruder, wherein the extruder output may extend away from the extruder along a longitudinal axis. The additive manufacturing system may also include one or more heaters positioned along at least a portion of the extruder output. As the material passes through the extruder output, the one or more heaters may at least partially melt the material. The additive manufacturing system may also include a gear pump in fluid communication with the extruder output for receiving the at least partially melted material. The additive manufacturing system may also include a nozzle in fluid communication with the gear pump for depositing the at least partially melted material.

The present disclosure may be drawn to additional exemplary embodiments of an additive manufacturing system. An additive manufacturing system may include an extruder having an opening dimensioned to receive a material. The additive manufacturing system may also include an extruder output fluidly connected to the extruder for receiving the material from the extruder, wherein the extruder output may extend from the extruder along a longitudinal axis. The additive manufacturing system may also include one or more heaters operably coupled to the extruder output for heating the extruder output, wherein as the material passes through the extruder output, the one or more heaters may at least partially melt the material. The additive manufacturing system may also include a nozzle in fluid communication with the extruder output for depositing the material once the material is at least partially melted. The additive manufacturing system may also include an actuator for adjusting the speed of the material through at least a portion of the additive manufacturing system. The additive manufacturing system may also include a temperature sensor and an indicator configured to communicate to an observer a temperature of the at least partially melted material, e.g., material in extruder output 61, material being deposited by nozzle 51, and/or a layer of material once deposited by nozzle 51.

Embodiments of the present disclosure may be drawn to additive manufacturing methods for forming a part. The method may include receiving a material into an opening of an extruder of the machine. The method may also include heating the material as it passes through an extruder output fluidly connected to the extruder to at least partially melt the material. The method may also include outputting the material from a nozzle in fluid communication with the extruder output to form a portion of the part. The method may also include adjusting a speed of movement of the material through the machine in response to input from an operator. The method may also include determining a temperature of the material output from the nozzle. The method may also include displaying the temperature of the material output from the nozzle.

As used herein, the terms "comprises," "comprising," or any other variation thereof, are intended to cover a non-exclusive inclusion, such as a process, method, article, or apparatus. The term "exemplary" is used in the sense of "example," rather than "ideal." As used herein, the term "long" will refer to a component having one dimension that is larger than the other dimensions and encompasses long, tall, wide, etc.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated herein, and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing, such as, e.g., 3D printing. Specifically, embodiments of the disclosure may be drawn to a machine that deposits (e.g., prints) at an ambient temperature, rather than in a heated environment. Exemplary machines may achieve this by using a larger print bead than is typically used in additive manufacturing output at a sufficiently high speed so that layers of deposited material may be naturally cooled to the proper temperature just as a subsequent layer of material is being deposited. This may allow the printing process to be continuous. Embodiments of the disclosure may also require less floor space than two separate machines, may not require the printed part to be moved for machining, may machine location marks for alignment into the printed part if the printed part may be moved, and/or may print and trim at the same time on the same machine.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
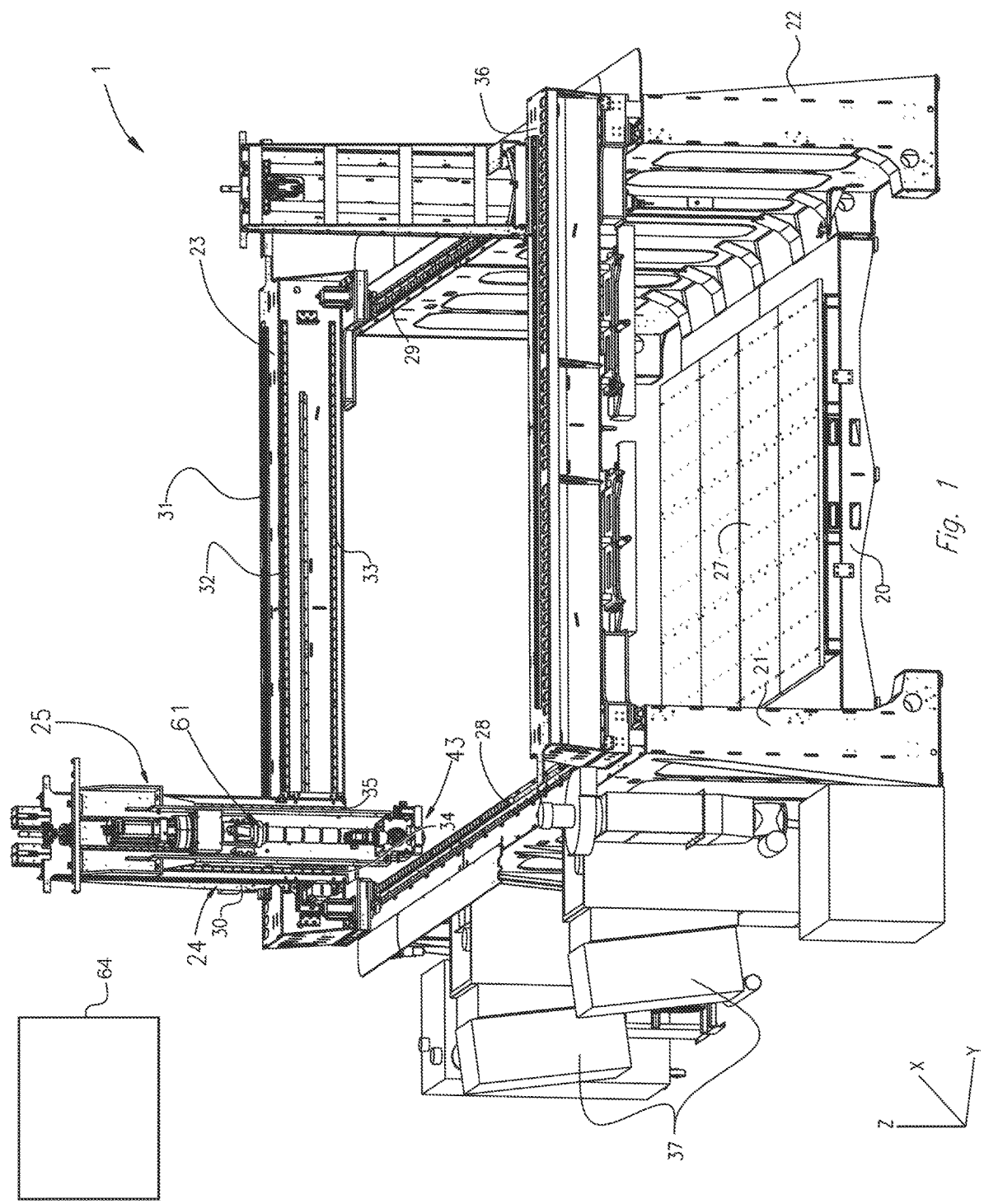
FIG. 1 is a perspective view of an exemplary CNC machine for forming articles in an additive manufacturing process, according to an aspect of the present disclosure.

With reference now to FIG. 1, there is illustrated a CNC machine 1 embodying aspects of the present disclosure. A controller (not shown) may be operably connected to CNC machine 1 for displacing an application nozzle 51 along a longitudinal line of travel (x-axis), a transverse line of travel (y-axis), and a vertical line of travel (z-axis), in accordance with a program inputted or loaded into the controller for performing an additive manufacturing process to form a desired component. In some examples, the program may be inputted or loaded into the computer for forming 3D printed components of a desired size and/or shape. CNC machine 1 may be configured to print or otherwise build 3D parts from digital representations of the 3D parts (e.g., AMF and STL format files) programmed or loaded into the controller.

For example, in an extrusion-based additive manufacturing system, a 3D part may be printed from a digital representation of the 3D part in a layer-by-layer manner by extruding a flowable material. The flowable material may be extruded through an extrusion tip or nozzle 51 carried by a print head or applicator head 43 of the system. The flowable material may be deposited as a sequence of beads or layers on a substrate in an x-y plane. In some examples, the x-y plane may be used for printing long parts without increasing the height of the machine. The extruded, flowable material may fuse to a previously deposited material and may solidify upon a drop in temperature. The position of the print head relative to the substrate may then be incrementally advanced along a z-axis (perpendicular to the x-y plane), and the process may then be repeated to form a 3D part resembling the digital representation.

CNC machine 1, shown in FIG. 1, includes a bed 20 provided with a pair of transversely spaced side walls 21 and 22, a printing gantry 23, and a trimming gantry 36 supported on opposing side walls 21 and 22, a carriage 24 mounted on printing gantry 23, a carrier 25 mounted on carriage 24, an extruder 61, and an applicator assembly 43 mounted on carrier 25. Located on bed 20 between side walls 21 and 22 is a horizontal worktable 27 provided with a support surface. The support surface may be disposed in an x-y plane and may be fixed or displaceable along an x-axis and/or a y-axis. For example, in a displaceable version, horizontal worktable 27 may be displaceable along a set of rails mounted on bed 20. Displacement of horizontal worktable 27 may be achieved using one or more servomotors and one or more rails (not shown) mounted on bed 20 and operatively connected to horizontal worktable 27.

Printing gantry 23 and trimming gantry 36 are disposed along a y-axis, supported on walls 21 and 22. In FIG. 1, printing gantry 23 and trimming gantry 36 are mounted on a set of guide rails 28, 29, which are located along a top surface of side walls 21, 22. Printing gantry 23 and/or trimming gantry 36 may either be fixedly or displaceably mounted, and, in some aspects, printing gantry 23 and trimming gantry 36 may be disposed along an x-axis. Printing gantry 23 and trimming gantry 36 may be displaceable by a set of servomotors (not shown) mounted on printing gantry 23 and trimming gantry 36 and operatively connected to tracks, e.g., guide rails 28, 29, provided on side walls 21 and 22 of bed 20. In an exemplary displaceable version, one or more servomotors may control movement of either printing gantry 23 and/or trimming gantry 36.

Carriage 24 is supported on printing gantry 23 and is provided with a support member 30 mounted on and displaceable along one or more guide rails 31, 32, and 33 provided on printing gantry 23. Carriage 24 may be displaceable along a y-axis on one or more guide rails 31, 32, and 33 by a servomotor mounted on printing gantry 23 and operatively connected to support member 30. Carrier 25 is mounted on one or more vertically disposed guide rails 34, 35 supported on carriage 24 for displacement of carrier 25 relative carriage 24 along a z-axis. Carrier 25 may be displaceable along the z-axis by a servomotor (not shown) mounted on carriage 24 and operatively connected to carrier 25. In some embodiments, guide rails (not shown) may be located adjacent bed 20 or along the sides of bed 20.

Figure 2:
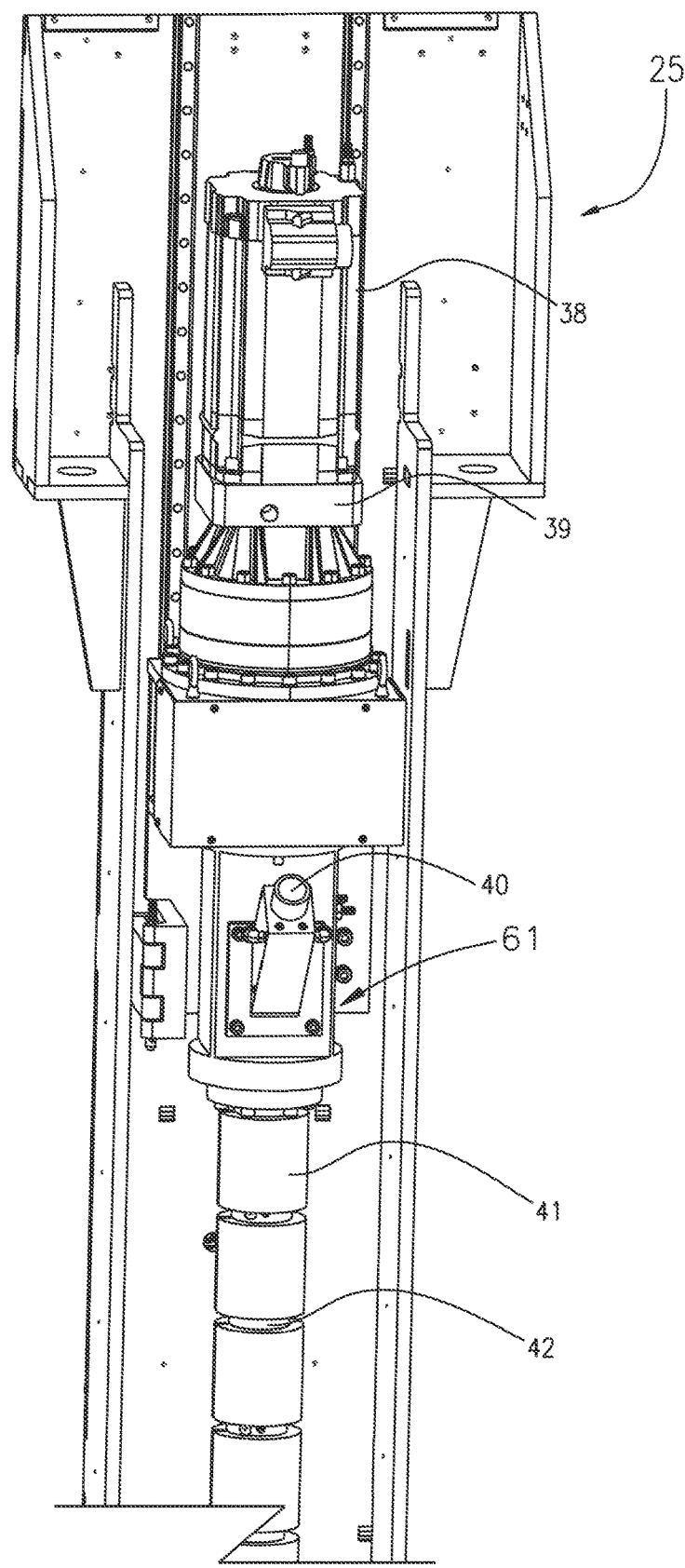
FIG. 2 is an enlarged perspective view of an exemplary carrier and extruder of the exemplary CNC machine shown in FIG. 1.

As best shown in FIG. 2, mounted to carrier 25 is an extruder 61, which may be larger than extruders used for standard 3D printing. Extruder 61 may be capable of extruding a flowable material (e.g., thermoplastic material) at a rate of about 110 pounds per hour up to 500 pounds per hour, allowing for a significantly faster printing rate. Extruder 61 may be large enough and may allow for a high enough throughput of flowable material to print the largest layer desired within a period of time permitted by the flowable material's natural cooling properties.

A screw (not shown) may be disposed within an extruder tube 42 of extruder 61. The screw may be actuated, or driven, by a servomotor 38, which may be operatively connected to the screw via a gearbox 39. One or more heaters 41 may surround at least a portion of extruder tube 42, as shown. In some embodiments, heaters 41 may wrap around a circumference of extruder tube 42. Heaters 41 may be disposed along a portion or along the entire length of tube 42.

Pellets of material may be introduced into a supply opening 40 of extruder tube 42. Those of ordinary skill will recognize that the pellets may be of any suitable material, for example, thermoplastic material. The material may also be delivered to extruder tube 42 in any suitable size or configuration, in addition to, or instead of, pellets. In an exemplary embodiment, the pellets introduced into extruder tube 42 may be heated by the friction generated from rotation of the screw and/or by one or more heaters 41 disposed along the length of extruder tube 42. In an exemplary embodiment, once the pellets have melted, the molten material may be forced under pressure by the screw further into extruder tube 42 and out of a bottom opening (not shown) of extruder 61. The molten material may be delivered to nozzle 51 for use in 3D printing activities, as described above.

Figure 3:
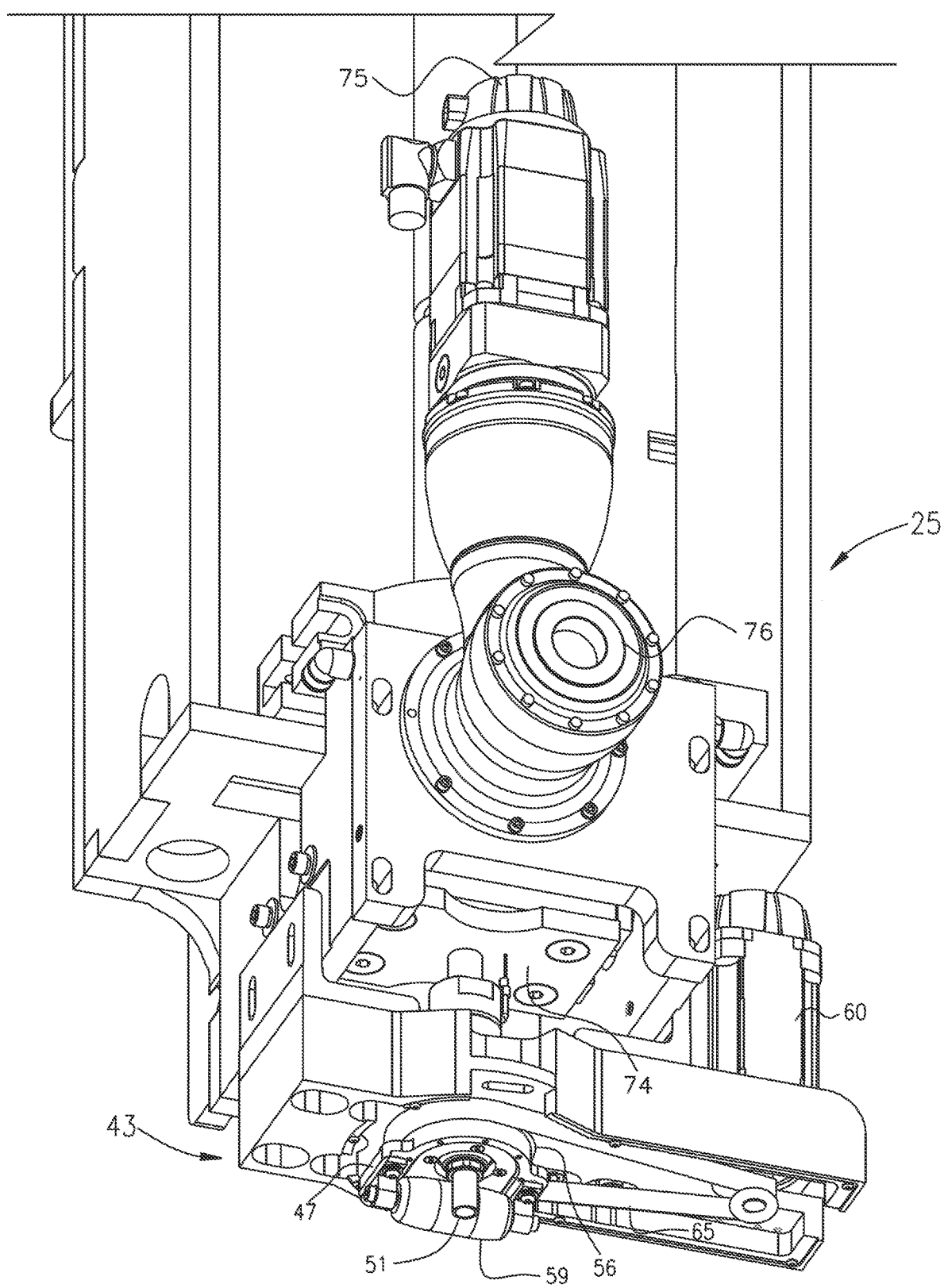
FIG. 3 is an enlarged perspective view of an exemplary carrier and applicator head assembly of the exemplary CNC machine shown in FIG. 1.

As best shown in FIG. 3, also mounted to carrier 25 (e.g., fixedly mounted to the bottom of carrier 25) is a positive displacement gear pump 74, which may be driven by a servomotor 75, through a gearbox 76. Gear pump 74 receives molten plastic from extruder 61, shown in FIG. 2. A bead shaping roller 59, for compressing material, may be mounted on a carrier bracket 47. Roller 59 may be movably mounted on carrier bracket 47, for example, rotatably or pivotably mounted. Roller 59 may be mounted so that a center portion of roller 59 is aligned with nozzle 51. In some examples, roller 59 may be oriented tangentially to nozzle 51. In some examples, nozzle 51 may be sized larger than nozzles used in standard 3D printing. Roller 59 may be mounted relative to nozzle 51 so that material, e.g., one or more beads of flowable material (such as a larger-than-average bead of thermoplastic resin), discharged from nozzle 51 is smoothed, flattened, leveled, and/or compressed by roller 59. One or more servomotors 60 may be configured to move, e.g., rotationally displace, carrier bracket 47 via a pulley or sprocket 56 and drive-chain or belt 65 arrangement, or by any other suitable means.

Figure 4:
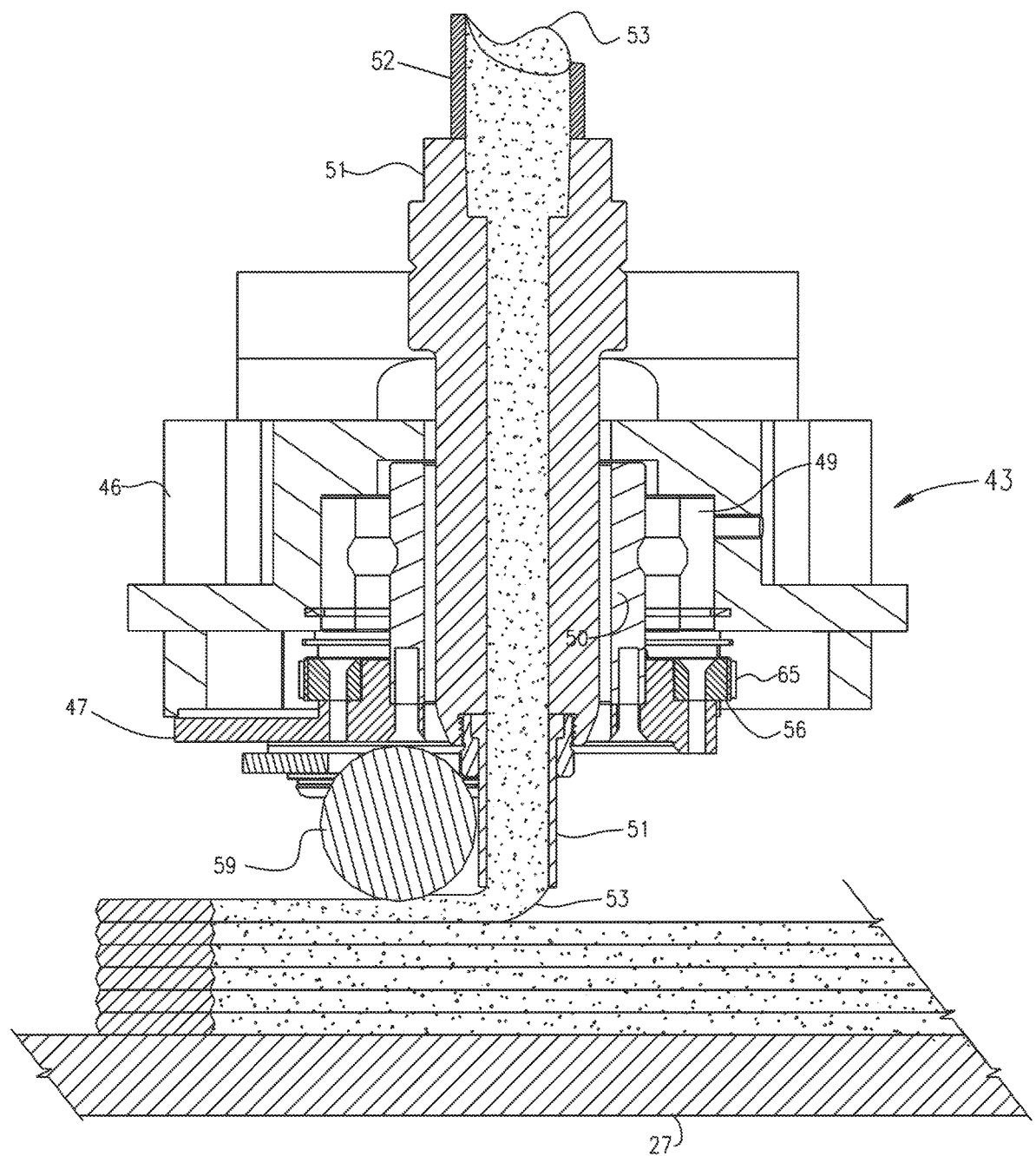
FIG. 4 is an enlarged cross-sectional view of an exemplary applicator head assembly of the exemplary carrier shown in FIG. 3, during use.

Continuing with reference to FIG. 4, applicator head 43 may include a housing 46 with a roller bearing 49 mounted therein. Carrier bracket 47 may be fixedly mounted to an adaptor sleeve 50, journaled in bearing 49. As best shown in FIGS. 2-4, a conduit 52 may be used to convey an oversized molten bead of a flowable material (e.g., thermoplastic material) under pressure from a suitable source (e.g., extruder 61 and an associated gear pump) disposed on carrier 25 to applicator head 43. Applicator head 43 may be fixedly (or removably) connected to, and in communication with, a larger-than-normal nozzle 51. In use, flowable material 53 (e.g., melted thermoplastic) may be heated sufficiently to form a large or oversized molten bead thereof, which is then extruded through conduit 52 and delivered through nozzle 51, to form rows of deposited material 53 on a surface of worktable 27. The rows deposited by the larger nozzle 51 may correspondingly be larger than normal.

Exemplary beads may range from approximately 0.1 inches thick to approximately 0.5 inches thick, and from approximately 0.5 inches wide to approximately 1.5 inches wide. In one embodiment, a bead may be approximately 0.20 inches thick and approximately 0.83 inches wide. It is contemplated that exemplary beads may be larger, e.g., approximately 0.5 inches thick and approximately 1.5 inches wide, or may be smaller, e.g., approximately 0.1 inches thick and approximately 0.5 inches wide. Smaller sized beads may constrain the size of the part that may be formed by depositing that bead, because smaller beads may cool quicker.

Such beads of molten material may be flattened, leveled, and/or fused to adjoining layers by any suitable means, such as, e.g., roller 59. As described above, successive layers may be deposited and fused to one another to form an article. In an exemplary embodiment, during operation of machine 1, each successive deposited (e.g., 3D printed) layer may not cool below the temperature at which proper layer-to-layer bonding occurs before the next layer is deposited on the previous layer. The proper bonding temperature may depend, e.g., on the type of polymer being printed. For example, when printing an ABS polymer, the temperature of the material may need to be at least approximately 100° C. for proper bonding to occur. However, with other polymers, proper bonding may require that the deposited material be hundreds of degrees higher.

The larger bead of flowable material used in embodiments of the present disclosure may contain more British Thermal Units ("BTUs") of heat than a standard small bead. The amount of heat energy within a print bead is generally dependent on the cross-sectional size of the bead. For example, if the bead is twice as large, it will generally contain twice as much heat energy, and if it is four times as large, it will generally contain four times as much heat energy. Also, a smaller, thinner bead has more surface area relative to its volume than a thicker bead, so the smaller, thinner bead will generally cool faster than the thicker bead. The exact BTU value of a given bead may vary based on, e.g., the type of polymer being used and the dimensions/geometry of the polymer bead.

Owing to the greater BTUs of heat in the large bead of material, more internal heat may be transferred from the freshly printed large bead of material to the previous printed layer. This heat transfer to the previous layer may allow the previously printed layer to cool more than normal before the subsequent layer is printed. Even though the previous layer is cooler, because of the greater BTUs of heat contained in the larger print bead of the subsequent layer, the subsequent layer may sufficiently reheat the previously deposited layer of flowable matter to create an acceptable layer-to-layer bond between the layers. Because the previous layer of deposited flowable material may be cooler, it may be in a relatively solid state prior to accepting the next layer of deposited material. Therefore, the overall part may be at a lower temperature than if the part had to be printed in an elevated temperature in a heated environment. When an entire part printed in a heated environment is finally cooled, internal stresses may tend to develop within the part, which may open undesirable voids in the interior of the part. This tendency may be reduced or avoided if the part is cooled, layer by layer, to a relatively solid state during the printing process, as described above.

Exemplary machines of the present disclosure may be used to deposit a flowable material (e.g., print thermoplastic material) at a speed at which the material may cool to the proper temperature range in the amount of time it may require to print each layer. For example, a bead with a thickness of approximately 0.2 inches and a width of approximately 0.83 inches may be deposited at a speed of between 75 and 500 inches per minute, and a melt core of approximately 40 mm may be used. A larger melt core (consisting of a feed housing, an extruder, and a polymer melt pump), which may process more material, may operate at print speeds of well over 1,000 inches per minute. In this way, the printing and cooling process may be continuous.

Machine 1 may include one or more features to facilitate the continuity of this process. In some embodiments, a manually controlled actuator (e.g., a knob, lever, switch, button, or other suitable component) (not shown) may be located on the print control of machine 1. The actuator may allow the operator to speed up or slow down the speed of the print process. In other words, the operator may actuate the actuator to adjust the speed of deposition of flowable material.

Additional features in the control may allow the operator to maintain a desired dimension of deposited flowable material (e.g., a dimension of the printed bead of material) despite changes in machine speed. Exemplary embodiments may include a control that performs at least two operations. First, the speed and path of machine 1 may be determined by a program being executed by the control, e.g., a CNC program. An independent process control, which operates independent of the CNC program, may monitor the speed at which machine 1 is moving and may adjust the speed of gear pump 74 correspondingly to maintain the proper bead dimension being deposited as the speed of machine 1 changes. The independent process control may also adjust the corresponding speed of the extruder feeding the melt pump. Embodiments of the disclosure may also include operator-adjustable "modifiers," which may further adjust the speed of gear pump 74 during periods of acceleration and deceleration to further adjust for any compressibility of the material being printed. This is because compressible materials may not react as quickly to changes in pump speed and so may need to be adjusted for. Embodiments may also include a separate manual control actuator, e.g., a knob, button, switch, or lever, which adjusts the ratio between the speed of machine 1 and the output of gear pump 74, Changing this ratio may change the width of the bead while flowable material is being deposited.

In some embodiments, machine 1 may include a velocimetry assembly (or multiple velocimetry assemblies) configured to determine flow rates (e.g., velocities and/or volumetric flow rates) of material 53 being delivered from applicator head 43. The velocimetry assembly may transmit signals relating to the determined flow rates to the aforementioned controller coupled to machine 1, which may then utilize the received information to compensate for variations in the material flow rates. For example, the velocimetry assembly may be used to control the thickness, or other suitable parameter, of the large or oversized bead of printed, flowable material.

In some embodiments, a thermographic camera system 64 (shown in FIG. 1), may be used to determine the temperature of material being deposited and may display the temperature of the flowable material being printed during the print process. Exemplary embodiments of machine 1 may be designed to operate at temperatures up to approximately 450° C. (825° F.). The particular print temperature used may depend, e.g., on the type of flowable material being deposited. In some embodiments, materials that are deposited at a higher temperature may tend to cool faster and so may be capable of being deposited at a faster speed. The speed of material deposition may be determined at least in part by the cooling characteristics of the material being deposited and/or the length of the deposited bead on each layer. For example, if a material cools from the temperature upon deposition to the proper temperature for receiving the subsequent later of material in a minute, and each layer is 200 inches long, then the print speed will be 200 inches/minute.

For example, one or more display screens, lights, or other suitable audio, visual, or haptic feedback indicators may be included in thermographic camera system 64 and/or on machine 1. In some embodiments, thermographic camera system 64 and/or machine 1 may include an indicator that allows the desired print temperature range and/or the actual print temperature range to be displayed, e.g., in text or in a specific color. In some embodiments, a color, e.g., the color green, may be displayed to the operator of machine 1 to indicate that the print process is occurring within the desired temperature range. Thus, if the part starts to become too hot or too cool, the color may change, change intensities, or may cease to be shown, which may indicate to the operator that the print process may need to be sped up or slowed down. Accordingly, the operator may adjust the print rate, e.g., speed the print rate up, which may lead to reducing the cooling time and increasing the temperature of each layer of deposited material. If the part becomes too hot, the deposition or print process may be slowed down, which may allow increased cooling time between layers and cooling the part.

The time required for a particular thermoplastic material to cool from print temperature to the proper temperature to accept the next layer is relatively fixed, because the properties of each thermoplastic material used is known in advance of deposition. By knowing the required time period, an alternative approach may be possible. In some embodiments, the operator may input the desired cooling time into the print control, and the operator or the print control may adjust the print feed speed so that machine 1 may require the amount of time input to print each layer. The operator may then be free to adjust the layer print time during the print process to allow for other variables at the operator's discretion. This approach may be desirable, e.g., for parts having a variable geometry, since feed speed may need to be adjusted for the different sized layers, which may be more difficult if done manually.

As shown in FIG. 1, trimming gantry 36 may be mounted on spaced side walls 21, 22 to perform trimming functions. Trimming gantry 36 may be controlled by the control of machine 1, or trimming gantry 36 may be controlled by a separate control unit. Printing gantry 23 and trimming gantry 36 may be mounted to worktable 27, which may allow machine 1 to print parts on the same worktable 27 that trimming gantry 36 uses to trim the parts. Therefore, less floor space may be used compared to having two separate machines to perform printing and trimming operations separately.

Since machine 1 uses one common worktable 27, which may be fixedly mounted to machine 1, the desired part or article does not require movement to a different machine for the trimming operation. Trimming gantry 36 may allow the part to be trimmed in the same location as it was printed or on another location of the same worktable. If an operator of machine 1 desires to move a printed part off of worktable 27, location marks may be machined into the part prior to moving it. In doing so, the location marks may be used later to realign the part to a different machine's coordinate system or to the same machine's coordinate system. Location marks may permit a part to be printed on a first machine and then trimmed at a later time on the same machine or on a different, second machine, if desired. Location marks may be used to easily and quickly align the printed part on the same machine or on a different machine.

During operation, machine 1 may print a part on one side of worktable 27 while at the same time trimming gantry 36 may trim a part on the other side of worktable 27 using a reservation system. Printing and trimming operations may include separate programs inputted into separate, respective controls, or the same control may control both operations. When a program is started, a control may measure how much space is available on worktable 27 to work on a part. Based on the measurement made by either control, the control that made the measurement may then communicate that information to the control that did not make the measurement. For example, the control of printing gantry 23 may create a first measurement and may forward that information to the control of trimming gantry 36. In effect, a reservation process is created. By reserving that worktable area for its own use, each of printing or trimming gantries 23 and 36 may make optimal use of available space on worktable 27. If the operator then attempts to begin a program on either the print control or the trim control, that control first determines if there is sufficient unreserved worktable area to process the program. If there is sufficient unreserved worktable area, it begins either the printing or trimming process. If there is insufficient unreserved worktable 27 area, the control informs the operator that there is not sufficient unreserved worktable 27 area available. Either control may use a display, or other suitable notification system, to inform the operator of the unreserved workable 27 area.

In an exemplary embodiment, a high-wall design, which may include one or more doors (not shown), may enclose the print and trim operations during operation of machine 1. Machine 1 may also include a dust and fume extraction system 37, as shown in FIG. 1. In some embodiments, dust and fume extraction system 37 may be mounted on either or both of spaced side walls 21 or 22. Dust and fume extraction system 37 may direct air from the printing process through appropriate filters to remove fumes created by the printing process. System 37 may also be used to remove airborne dust that may be created during the trimming process. System 37 may also support one or more vacuum hoses, which may allow the operator to vacuum up trim chips created during the trimming process.

Figure 5:
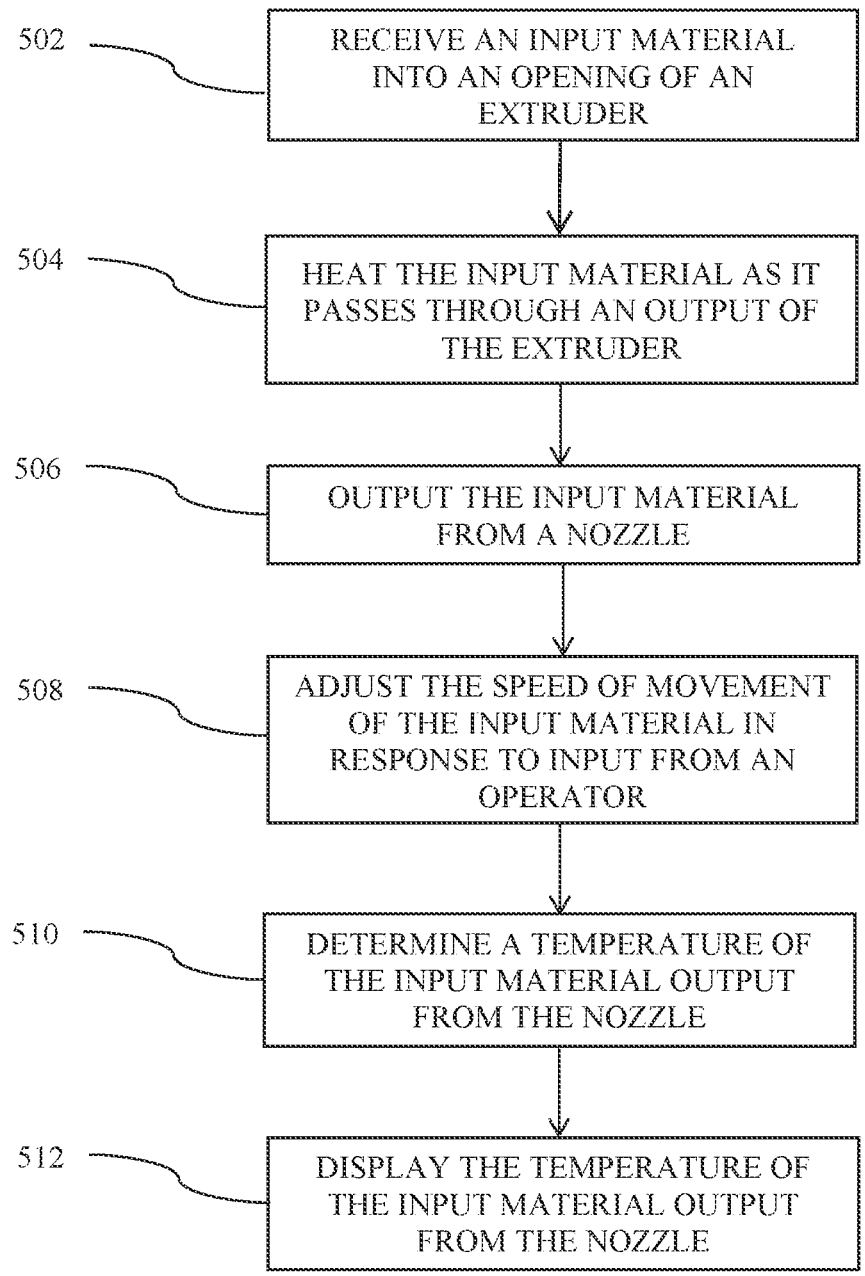
FIG. 5 is a flow-chart depicting steps of an exemplary method, according to an aspect of the present disclosure.

FIG. 5 depicts an exemplary additive manufacturing method of forming a part using CNC machine 1. At a first step 502, opening 40 of extruder 61 may receive an input material (e.g., thermoplastic pellets). At a next step 504, extruder 61 may be actuated to heat, in order to at least partially melt, the input material. As input material passes through extruder tube 42 of extruder 61, input material may be heated by actuating one or more heaters 41, which surround extruder tube 42. Input material may also be heated by friction generated by rotation of the screw disposed within extruder tube 42. The screw may be driven by servomotor 38, which may be operatively connected through gearbox 39.

Next, at a step 506, the input material may be output from nozzle 51. Nozzle 51 may be in fluid communication with extruder tube 42. Nozzle 51 may be oversized to create a large deposit of flowable material (e.g., one or more large thermoplastic print beads). Nozzle 51 may be used to deposit the melted input material (e.g., melted thermoplastic material). Further, at a step 508, an actuator may be adjusted by the operator of machine 1 to adjust the speed of the input material through the system. An exemplary actuator may be a manually controlled knob, lever, switch, or button mounted to CNC machine 1.

Next, at a step 510, a temperature of the input material output from nozzle 51 may be determined. In some embodiments, a temperature sensor may be used to determine the temperature of material output from nozzle 51, for example, the temperature sensor may comprise a thermometer, thermistor, thermocouple, or any other suitable sensor. In some embodiments, the temperature may be determined using one or more thermographic cameras.

One of ordinary skill in the art will recognize that steps 506, 508, and 510 may be performed in any particular order (e.g., the speed may be adjusted prior to output of material from nozzle 51 or the temperature may be determined prior to adjusting the speed). It is also acknowledged that steps may occur simultaneously with one another or may be ongoing throughout the process (e.g., material may be output from nozzle 51 as the speed is being adjusted or as the temperature of the output material is being determined).

At a last step 512, the determined temperature may be displayed to the operator of machine 1. The temperature displayed may be the temperature of the input material as it is output from nozzle 51 and may be provided to the operator. The temperature may alternatively or additionally be the temperature of partially melted input material as it passes through extruder tube 42. In some embodiments, the temperature may be displayed on any suitable screen or display device incorporated as part of or removably or fixedly mounted to CNC machine 1 and/or a thermographic camera system 64. In some embodiments, an indicator or other suitable device may be configured to communicate to an operator (e.g., observed by the operator) the temperature obtained at step 512. Other suitable devices may include one or more display screens, lights, or other suitable audio, visual, or haptic feedback indicators. The one or more indicators may be included in thermographic camera system 64 and/or on machine 1.

While steps 502-512 are depicted in a particular order, the principles of the present disclosure are not limited to the order depicted in FIG. 5. Further, any of steps 502-512 may occur simultaneously and/or may be repeated two or more times during operation of machine 1.

In the course of fabricating a component pursuant to the methods described herein, the control system of CNC machine 1, in executing the inputted program, may operate the several servomotors as described to displace printing gantry 23 and/or trimming gantry 36 along the x-axis, displace vertical worktable along the x-axis, displace carriage 24 along the y-axis, displace carrier 25 along the z-axis, and rotate bracket 47 about the x-axis thereof, in accordance with the inputted program, to provide the desired end product or a near duplicate thereof. In some examples, bracket 47 may carry roller 59 so that when roller 59 is rotated from printing on a horizontal plane to printing on a vertical plane, roller 59 changes from rotating about the z-axis to rotating about the x-axis.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

What is claimed is:

1. A method of forming a part using an additive manufacturing machine, the method comprising:
   receiving material with an extruder of the additive manufacturing machine;
   heating the material as the material passes through the extruder;
   depositing the material with a nozzle in fluid communication with the extruder to form a portion of the part;
   adjusting a speed of movement of the material through the additive manufacturing machine in response to a first input from an operator and based on cooling characteristics of the material, wherein the cooling characteristics of the material include a rate at which the material cools upon deposition from the additive manufacturing machine;
   determining a temperature of the material after the material is output from the nozzle;
   generating a first indication of the temperature of the material output from the nozzle and second indication of whether the temperature of the material output from the nozzle is within a predetermined temperature range; and
   based on the cooling characteristics of the material, further adjusting the speed of movement of the material through the additive manufacturing machine in response to a second input from the operator.

2. The method of claim 1, wherein the second indication notifies an operator that the temperature of the material is within the predetermined temperature range.

3. The method of claim 1, wherein the second indication notifies an operator that a deposition rate of the additive manufacturing machine should be increased or should be decreased.

4. The method of claim 1, wherein the second indication confirms that the material output from the nozzle has a temperature that is within the predetermined range.

5. The method of claim 1, wherein the additive manufacturing machine is capable of depositing material at a speed of between 75 and 500 inches per minute.

6. The method of claim 1, wherein each of the first indication and the second indication is presented on a display.

7. The method of claim 1, wherein the temperature is determined with a thermal sensor.

8. The method of claim 7, wherein the thermal sensor is a thermographic camera.

9. The method of claim 1, further including modifying the second indication in response to a change in the temperature of the material output from the nozzle that results in the temperature of the material being outside of the predetermined temperature range.

10. A method of forming a part using an additive manufacturing machine, the method comprising:
    receiving material with an extruder of the additive manufacturing machine;
    heating the material as the material passes through the extruder;
    depositing the material with a nozzle in fluid communication with the extruder to form a portion of the part;
    determining a translation speed of the nozzle to be between 75 and 500 inches per minute based on cooling characteristics of the material, wherein the cooling characteristics of the material include a rate at which the material cools upon deposition from the additive manufacturing machine;
    determining a temperature of the material;
    cooling the material after depositing the material;
    displaying an indication that indicates whether the temperature of the material is within a predetermined temperature range; and
    based on the cooling characteristics of the material, adjusting the speed of movement of the material through the additive manufacturing machine in response to an input from an operator.

11. The method of claim 10, wherein cooling the material is performed with a fan.

12. The method of claim 10, wherein the indication notifies an operator that the temperature of the material is within the predetermined temperature range.

13. The method of claim 10, wherein the indication notifies an operator that a cooling time of a deposited layer of material should be increased or should be decreased.

14. The method of claim 10, wherein the indication confirms that the material deposited from the nozzle has a temperature that is within the predetermined range.

15. The method of claim 10, wherein the material is deposited while translating the nozzle at a speed of between 75 and 500 inches per minute.

16. The method of claim 10, further including modifying the indication in response to a change in the temperature of the material deposited from the nozzle that results in the temperature of the material being outside of the predetermined temperature range.

17. A method of forming a part using an additive manufacturing machine, the method comprising:
receiving a thermoplastic material with an extruder of the additive manufacturing machine;
heating the thermoplastic material within the extruder;
depositing the thermoplastic material at a rate of about 110 pounds of thermoplastic material per hour to about 500 pounds of thermoplastic material per hour from a nozzle secured to an applicator to form a portion of the part, the rate being based on cooling characteristics of the thermoplastic material, wherein the cooling characteristics of the material include a rate at which the material cools upon deposition from the additive manufacturing machine;
determining a temperature of the thermoplastic material with a temperature sensor;
displaying an indication based on the temperature of the thermoplastic material; and
based on the cooling characteristics of the material, adjusting a speed of movement of the material through the additive manufacturing machine in response to an input from an operator.

18. The method of claim 17, wherein the indication notifies an operator that a deposition rate of the additive manufacturing machine should be increased or should be decreased.

19. The method of claim 18, further including cooling the material with a fan after depositing the material.

20. The method of claim 19, further including modifying the indication in response to a change in the temperature of the material deposited from the nozzle such that the temperature of the material is outside of a predetermined temperature range.

* * * * *